United States Patent
Williamson (10) Patent No.: US 9,910,708 B2
(45) Date of Patent: Mar. 6, 2018

(54) PROMOTION OF CALCULATIONS TO CLOUD-BASED COMPUTATION RESOURCES

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 1358 days.

(21) Appl. No.: 12/200,281

(22) Filed: Aug. 28, 2008

(65) Prior Publication Data
US 2010/0057831 A1   Mar. 4, 2010

(51) Int. Cl.
G06F 15/173  (2006.01)
G06F 9/50   (2006.01)
H04L 29/08  (2006.01)

(52) U.S. Cl.
CPC ...... G06F 9/5027 (2013.01); *G06F 2209/549* (2013.01); *H04L 67/10* (2013.01); *H04L 67/1008* (2013.01)

(58) Field of Classification Search
CPC ....... G06F 2209/5017; G06F 2209/549; G06F 9/5044; H04L 67/10; H04L 67/1008
USPC ........................................................ 709/224
See application file for complete search history.

(56) References Cited

U.S. PATENT DOCUMENTS

| | | | |
|---|---|---|---|
| 6,463,457 B1 | 10/2002 | Armentrout et al. | |
| 6,578,068 B1 * | 6/2003 | Bowman-Amuah | ......... 709/203 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,720,683 B1 * | 5/2010 | Vermeulen et al. | .......... 704/254 |
| 7,912,956 B1 * | 3/2011 | Williams | .............. G06F 9/5083 709/223 |
| 9,027,011 B1 * | 5/2015 | Lam | .................... G06F 9/44505 717/158 |
| 2001/0023360 A1 * | 9/2001 | Nelson et al. | .................. 607/60 |
| 2001/0039497 A1 | 11/2001 | Hubbard | |

(Continued)

OTHER PUBLICATIONS

"rBuilder and the rPath Appliance Platform", 2007 rPath, Inc., www.rpath.com, 3 pages.

(Continued)

*Primary Examiner* — Oleg Survillo
(74) *Attorney, Agent, or Firm* — Lowenstein Sandler LLP (57) ABSTRACT

Embodiments relate to systems and methods for the promotion of calculations to cloud-based computation resources. One or more applications, such as spreadsheet applications, can prepare the calculation of a relatively large-scale computation, such as running statistical reports on large (e.g., greater than 1000 by 1000 cell) spreadsheets or other data objects. If the pending calculation is determined to be greater than a computation threshold for instance in computation intensity or data size, a computation request can be sent to a promotion engine. The promotion engine can identify a set of computation resources located in a cloud or other network and transmit the data request and subject data to the set of computation resources, which afford greater computation speed than the local machine hosting the requesting application. A set of results is returned from the cloud to the requesting application, thereby creating higher bandwidth and faster calculation times for the user.

20 Claims, 5 Drawing Sheets

(56) References Cited

U.S. PATENT DOCUMENTS

| | | |
|---|---|---|
| 2002/0069276 A1 | 6/2002 | Hino et al. |
| 2002/0156932 A1* | 10/2002 | Schneiderman ...... G06F 9/4862 719/317 |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2003/0191838 A1* | 10/2003 | Tsao ................ H04L 67/1097 709/225 |
| 2003/0236813 A1* | 12/2003 | Abjanic .................... 709/102 |
| 2004/0010788 A1* | 1/2004 | Cota-Robles ........ G06F 9/5044 718/1 |
| 2004/0162902 A1* | 8/2004 | Davis ....................... 709/227 |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0080894 A1* | 4/2005 | Apostolopoulos et al. .. 709/224 |
| 2005/0131898 A1 | 6/2005 | Fatula |
| 2005/0144060 A1 | 6/2005 | Chen et al. |
| 2005/0165925 A1* | 7/2005 | Dan et al. ................. 709/224 |
| 2005/0182727 A1 | 8/2005 | Robert et al. |
| 2005/0204158 A1* | 9/2005 | Tobe .................... G06F 21/105 726/7 |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0089111 A1* | 4/2007 | Robinson ............... G06F 21/53 718/1 |
| 2007/0118631 A1* | 5/2007 | Devarakonda .......... H04L 41/06 709/223 |
| 2007/0124363 A1* | 5/2007 | Lurie et al. .................. 709/202 |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0021987 A1* | 1/2008 | Bates et al. .................. 709/223 |
| 2008/0059582 A1* | 3/2008 | Hartikainen et al. ......... 709/204 |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082546 A1* | 4/2008 | Meijer et al. ................ 707/10 |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0089338 A1* | 4/2008 | Campbell ............... H04L 45/00 370/392 |
| 2008/0091613 A1 | 4/2008 | Gates et al. |
| 2008/0104608 A1 | 5/2008 | Hyser et al. |
| 2008/0183876 A1* | 7/2008 | Duvur ................ H04L 67/1008 709/228 |
| 2008/0215796 A1 | 9/2008 | Lam et al. |
| 2008/0240150 A1 | 10/2008 | Dias et al. |
| 2009/0007101 A1* | 1/2009 | Azar ..................... G06F 9/4881 718/1 |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0150529 A1* | 6/2009 | Tripathi .................. G06F 9/455 709/222 |
| 2009/0177514 A1 | 7/2009 | Hudis et al. |
| 2009/0193126 A1* | 7/2009 | Agarwal et al. .............. 709/228 |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222560 A1* | 9/2009 | Gopisetty ................. G06F 8/60 709/226 |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1* | 11/2009 | Ferris ..................... G06F 9/5077 718/1 |
| 2009/0299905 A1 | 12/2009 | Mestha et al. |
| 2009/0299920 A1* | 12/2009 | Ferris ..................... G06Q 10/06 705/418 |
| 2009/0300057 A1 | 12/2009 | Friedman |
| 2009/0300149 A1* | 12/2009 | Ferris ..................... G06F 15/177 709/222 |
| 2009/0300151 A1 | 12/2009 | Friedman et al. |
| 2009/0300152 A1* | 12/2009 | Ferris ..................... G06F 9/5072 709/223 |
| 2009/0300169 A1* | 12/2009 | Sagar et al. ................... 709/224 |
| 2009/0300210 A1* | 12/2009 | Ferris ..................... G06F 9/5077 709/235 |
| 2009/0300423 A1* | 12/2009 | Ferris ..................... G06F 11/36 714/38.1 |
| 2009/0300607 A1* | 12/2009 | Ferris .................. G06F 9/45558 718/1 |
| 2009/0300608 A1* | 12/2009 | Ferris .................. G06F 9/45558 718/1 |
| 2009/0300635 A1* | 12/2009 | Ferris ..................... G06F 9/5072 718/104 |
| 2009/0300641 A1 | 12/2009 | Friedman et al. |
| 2009/0300719 A1* | 12/2009 | Ferris ..................... G06F 21/606 726/3 |
| 2010/0020820 A1* | 1/2010 | Jones ..................... H04L 47/10 370/465 |
| 2010/0027420 A1* | 2/2010 | Smith .................... G06F 9/4856 370/235 |
| 2010/0042720 A1 | 2/2010 | Stienhans et al. |
| 2010/0050172 A1* | 2/2010 | Ferris ..................... G06F 9/4856 718/1 |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0261484 A1* | 10/2010 | Paulson et al. ............. 455/456.3 |
| 2010/0299366 A1 | 11/2010 | Stienhans et al. |
| 2010/0318650 A1* | 12/2010 | Nielsen ....................... 709/224 |
| 2011/0016214 A1 | 1/2011 | Jackson |
| 2011/0131335 A1 | 6/2011 | Spaltro et al. |

OTHER PUBLICATIONS

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

(56) References Cited

OTHER PUBLICATIONS

Ferris, "Methods and Systems for Providing a Universal Marketplace for Resources for Delivery to a Cloud Computing Environment", U.S. Appl. No. 12/475,228 filed May 29, 2009.
DeHaan et al., "Systems and Methods for Power Management in Managed Network Having Hardware-Based and Virtual Reources", U.S. Appl. No. 12/475,448, filed May 29, 2009.
DeHaan et al., "Methods and Systems for Flexible Cloud Management with Power Management Support", U.S. Appl. No. 12/473,987, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan, "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris, "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081 filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646 filed Nov. 30, 2009.
Ferris et al., "Methods and Systems for Verifying Software License Compliance in Cloud Computing Environments", U.S. Appl. No. 12/627,643, filed Nov. 30, 2009.
Ferns et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferns et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334 filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.

(56) References Cited

OTHER PUBLICATIONS

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, flied Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

\* cited by examiner

PROMOTION OF CALCULATIONS TO CLOUD-BASED COMPUTATION RESOURCES

FIELD

The present teachings relate to systems and methods for promotion of calculations to cloud-based computation resources, and more particularly to platforms and techniques for uploading computation-intensive spreadsheets or other calculations to cloud-based processing centers capable of efficiently completing and returning large-scale computation results to a requesting client.

BACKGROUND OF RELATED ART

Consumer-level software applications have expanded in scope and capability in recent years. A variety of spreadsheet, database, and other computational software packages are available to the business consumer and other markets. However, despite the availability of software applications of a variety of types and capabilities, large-scale spreadsheet and other computation-intensive applications are not always an effective or feasible tool for some applications. Consumer spreadsheet applications, for example, can sometimes be bogged down or possibly be made to crash by large-scale spreadsheet or matrix calculations, for instance, on the order of a 1000 by 1000 cell spreadsheets or larger. This can be due to, for example, the fact that even multiple-core desktop processors may not present enough computing throughput to process the large-scale computation required, for example, by linear regression, Monte Carl simulation, or other calculations. In other cases, the storage media on a desktop machine may also not be able to transfer data to or from processor or memory quickly enough to avoid bogging down during such large-scale computational tasks.

The advent of cloud-based computing resources has opened a new range of resources that computer users can subscribe to. Cloud-based networks permit users to arrange for the temporary usage of the collective networked assets of a set of resource servers from which processing, memory, software, or other resources may be extracted for a given period of time. In the case of machines attempting to execute a high-load application such as for instance a spreadsheet or data mining application, it may be desirable to provide methods and systems which permit an individual or small-scale client to promote the necessary computational load to a cloud-based network of highly scaled processing resources.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for promotion of calculations to cloud-based computation resources. More particularly, embodiments relate to platforms and techniques for detecting high-load computations in a local spreadsheet or other application, and generating the transfer of the computational task to a set of cloud-based computation resources. A networked promotion engine can receive a request from, or generate a request for, a spreadsheet or other application to transmit and promote the computational load for a given calculation or report to the cloud. In embodiments, the request for promotion of the calculations to the cloud can be triggered based on a computation threshold or data-size threshold. The promotion engine can receive the subject spreadsheet or other data and transmit that data to a set of computing resources in the cloud. In embodiments, those resources can be or include, for instance, processor throughput in the form of processor cycles on a server, machine cluster, or other hardware network or set of computation resources. In general, the set of computation resources can represent a greater or higher-throughput processing capacity than the client machine hosting the requesting application. The set of computation resources can receive the data and computation request, and perform the calculations on the set of computation resources in the cloud. The set of computation resources can return a set of results to the requesting application on the client or other device. In embodiments, the user can subscribe to the set of computation resources in the cloud, for instance on an on-demand or other basis. These and other embodiments described herein address the various noted shortcomings in known application technology, and provide a user or network operator with enhanced computational power on a transparent, on-demand basis.

Reference will now be made in detail to exemplary embodiments of the present teachings, which are illustrated in the accompanying drawings. Where possible the same reference numbers will be used throughout the drawings to refer to the same or like parts.

Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

Figure 1:
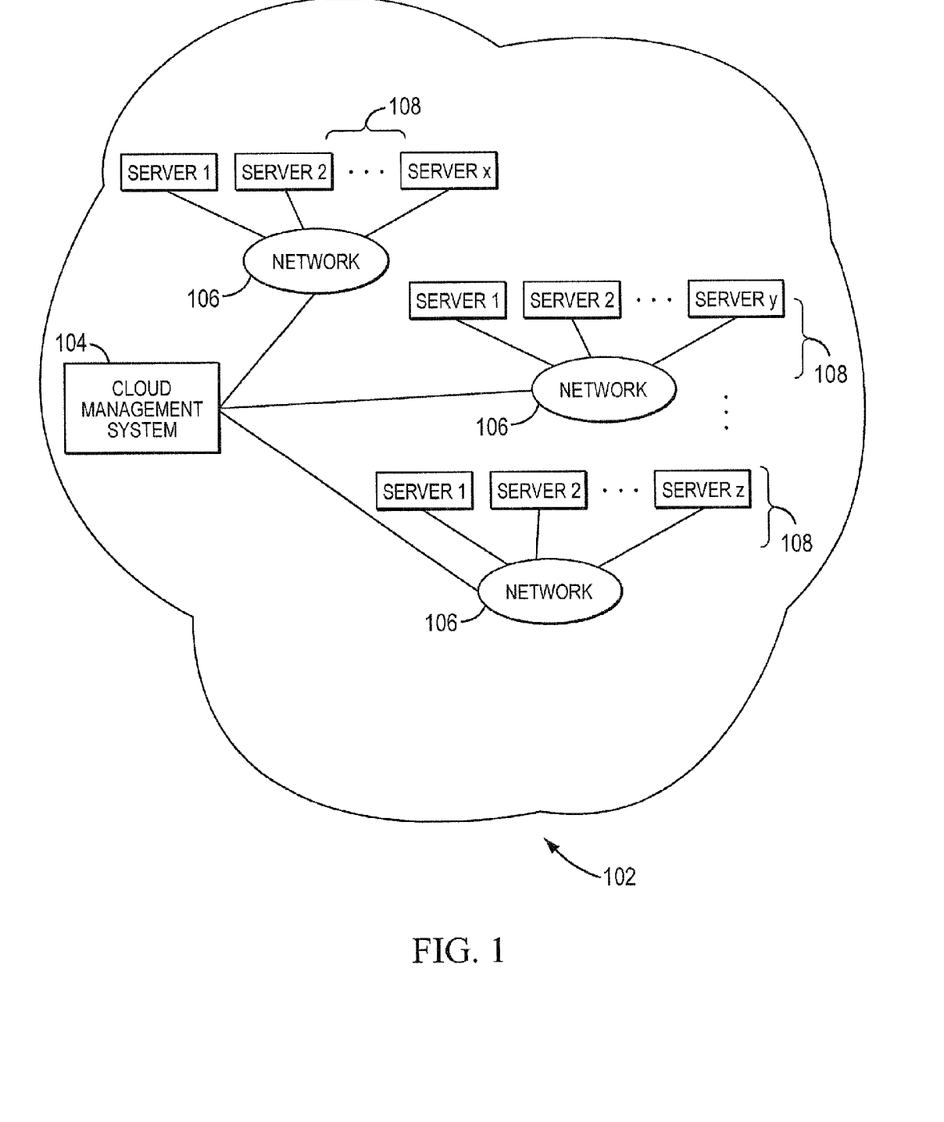
FIG. 1 illustrates an overall cloud system architecture in which various embodiments of the present teachings can be practiced.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
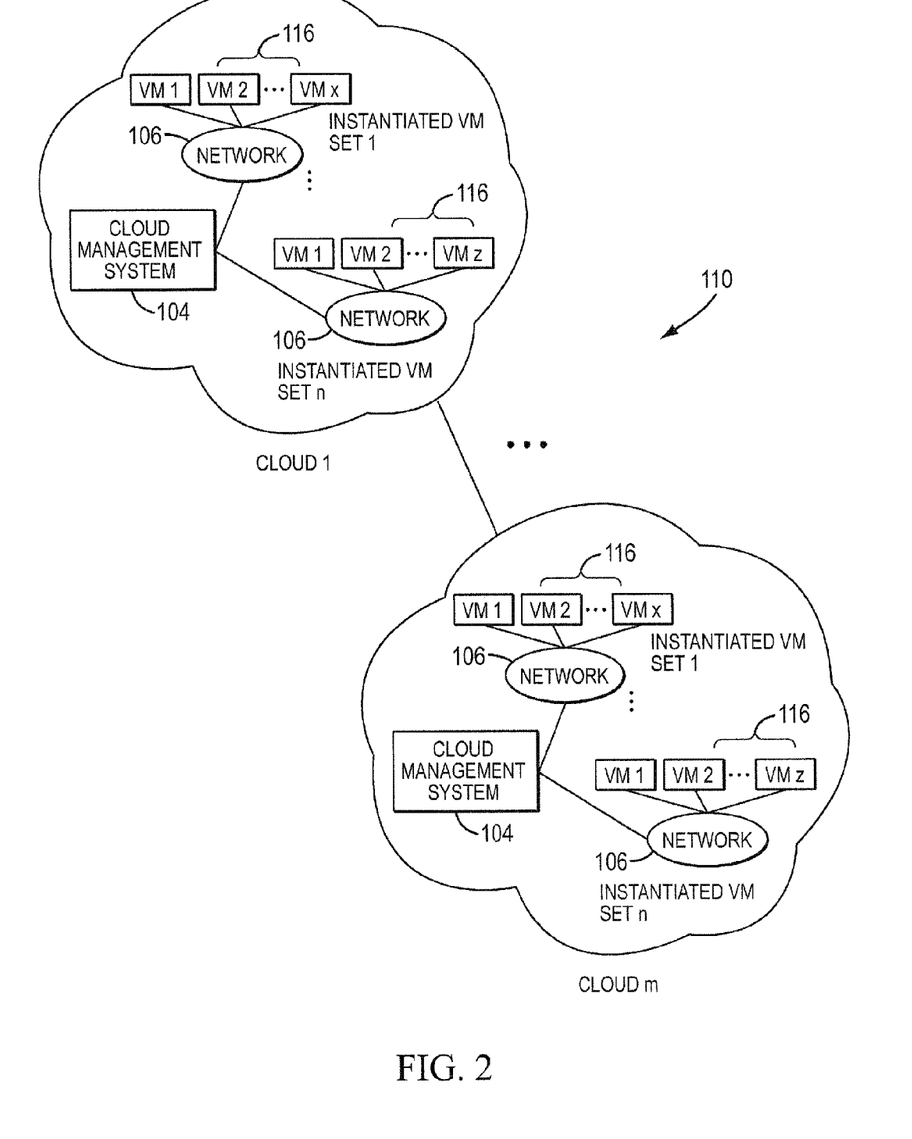
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 114 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
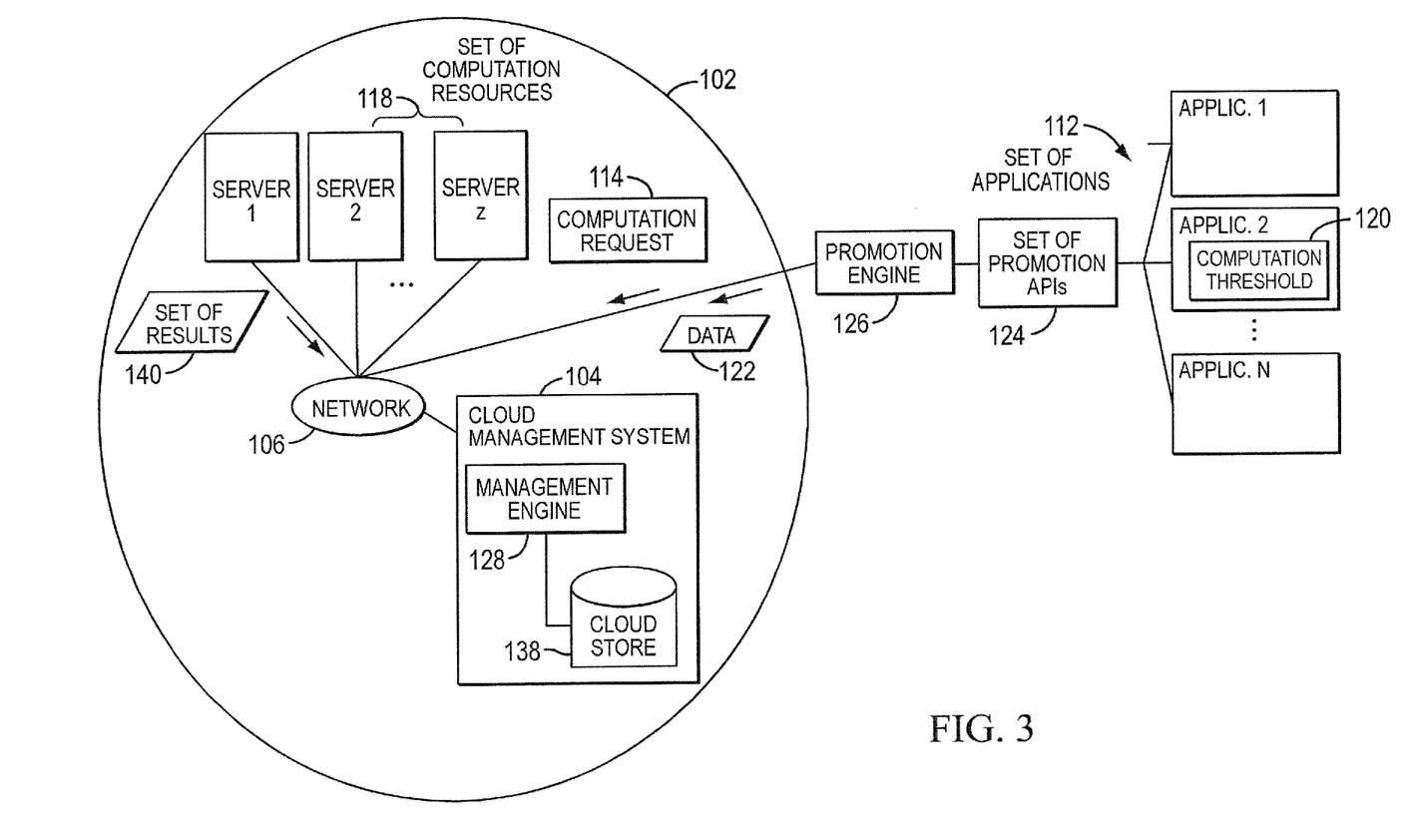
FIG. 3 illustrates an overall system for the promotion of calculations to cloud-based computational resources, according to various embodiments of the present teachings.

FIG. 3 illustrates an overall network in which systems and methods for the promotion of calculations to cloud-based computation resources can operate, according to various embodiments. In embodiments as shown, a set of applications 112 can communicate with a promotion engine 126 via a set of promotion application programming interfaces (APIs) 124. The set of applications 112 can, for instance, be or include one or more spreadsheet applications. The set of applications 112 can in addition or instead include other numerical or quantitative applications, such as, for example, database applications, statistical applications, modeling applications, or other applications or software. The set of promotion APIs 124 can permit any application in set of applications 112, and/or the operating system of any local machine hosting set of applications 112, to communicate with promotion engine 126 and other resources. Promotion engine 126 can in turn communicate with a cloud 102, including a set of computation resources 118. Set of computation resources 118 can be or include a set of servers, personal computers, or other devices, machines, or networks representing comparatively greater computational power than that available on any local client hosting set of applications 112. For instance, set of computation resources 118 can be or include one or more servers or other processors, or clusters of processors, which together represent a comparatively high-throughput computation engine or resource.

More particularly, a requesting application in set of applications 112 can transmit a computation request 114 to promotion engine 126 when a local computational burden in one or more local application operating on data 122 meets or exceeds a computation threshold 120. In embodiments, computation threshold 120 can be a predetermined computational threshold. Computation threshold 120 can, for example, a threshold based on computation time, computation throughput, or the size of data 122. For example, computation threshold 120 can be set to a computation time on the user's local machine of 15 minutes, or to a size of at least 1000 by 1000 cells in data 122. In embodiments, computation threshold 120 can be manually configured by the user of set of applications 112. In embodiments, computation threshold 120 can be automatically or dynamically set by set of applications 112 themselves or by other logic, for instance, based on deviations from average computation times or data sizes for recent execution runs. Other types and values of computation threshold 120 can be used. In embodiments, set of applications 112 themselves can detect the reaching of computation threshold 120. In embodiments, promotion engine 126 can monitor processing conditions in set of applications 112 and detect the reaching of computation threshold 120.

When triggered by the reaching of computation threshold 120, a computation request 114 can be transmitted by one or more requesting application in set of applications 112 to promotion engine 126, along with data 122. Computation request 114 can specify parameters for the execution of the processing to be carried out, for example, the precision or accuracy of the desired calculations, the format of the data 122, a time for delivery of any results, or other parameters. Promotion engine 126 can transmit computation request 114 and data 122 to set of computation resources 118 via one or more networks 106. Set of computation resources 118 can be identified, for example, by promotion engine 126 and/or the management engine 128 of cloud management system 104, which can be used to assemble computation resources available to the user of set of applications 112. For example, the user can be a subscriber to virtual machines or other computation resources in cloud 102. The computation resources 118 can, in embodiments, be instantiated on demand by the user when a computation request 114 is received.

After receipt of computation request 114 and data 122, the set of computation resources can perform the processing, calculation, or computation requested in computation request 114 and generate a set of results 140 as a result of that processing. In embodiments, set of results 140 can include, for example, a spreadsheet calculation, database sort or other calculation, a statistical or modeling calculation, or other calculations, processing, or output. Set of computation resources 118 can then transmit set of results 140 to the requesting application(s) via promotion engine 126, or directly via one or more networks 106. Set of applications 102 can store the set of results 140 and present those results to the user, as appropriate. In embodiments, the set of results 140 can be transparently incorporated into the user's view of the requesting application(s), without an indication that the calculations were transmitted offsite to remote computation resources. In embodiments, the user can be notified of the generation of set of results 140 via cloud 102 or other networked resources.

Figure 4:
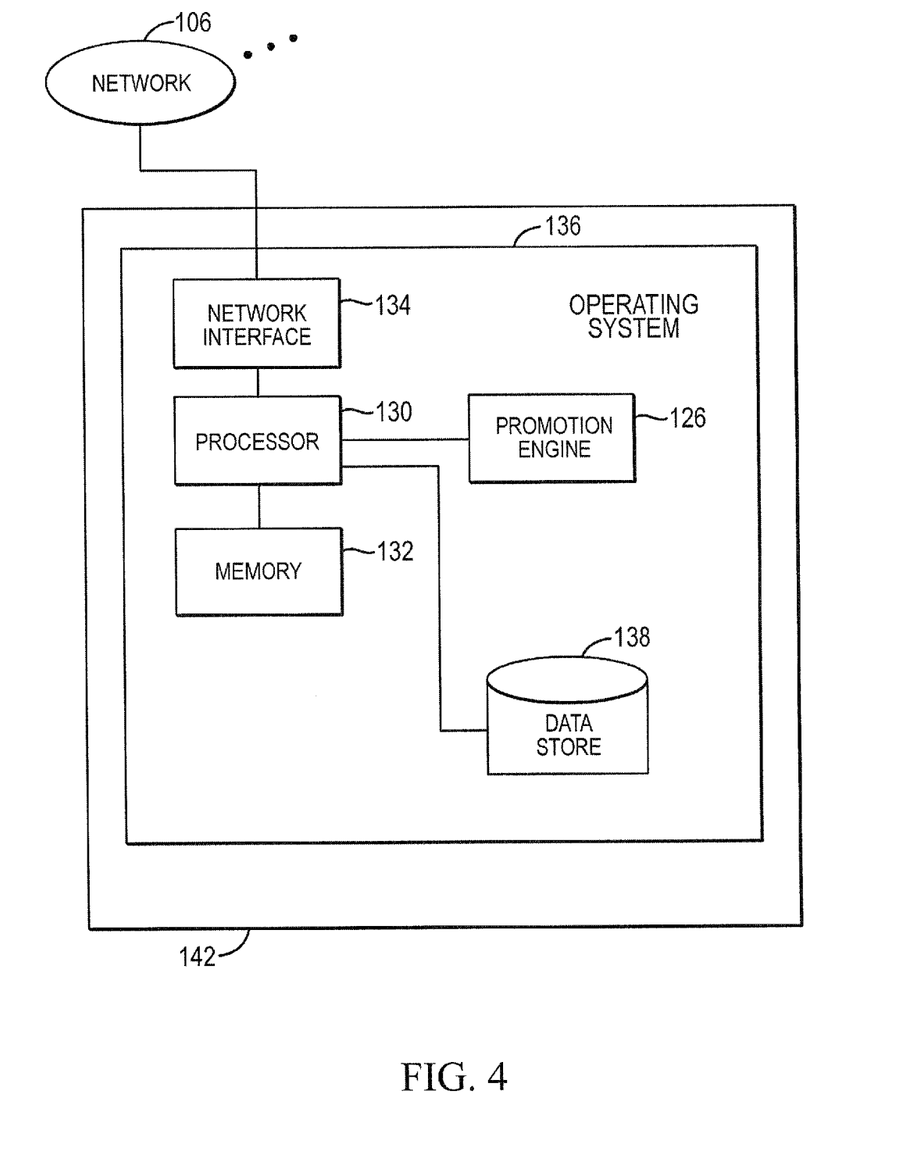
FIG. 4 illustrates an exemplary hardware configuration for a system configured to promote computational tasks to cloud-based processing resources, according to various embodiments.

FIG. 4 illustrates an exemplary configuration of a system 142 that can host, support or execute promotion engine 126, according to various embodiments. In embodiments as shown, system 142 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with promotion engine 126, to execute control logic and control the distribution of promoted computational tasks to the computing resources in cloud 102. Other configurations of promotion engine 126, associated network connections, and other hardware and software resources are possible.

Figure 5:
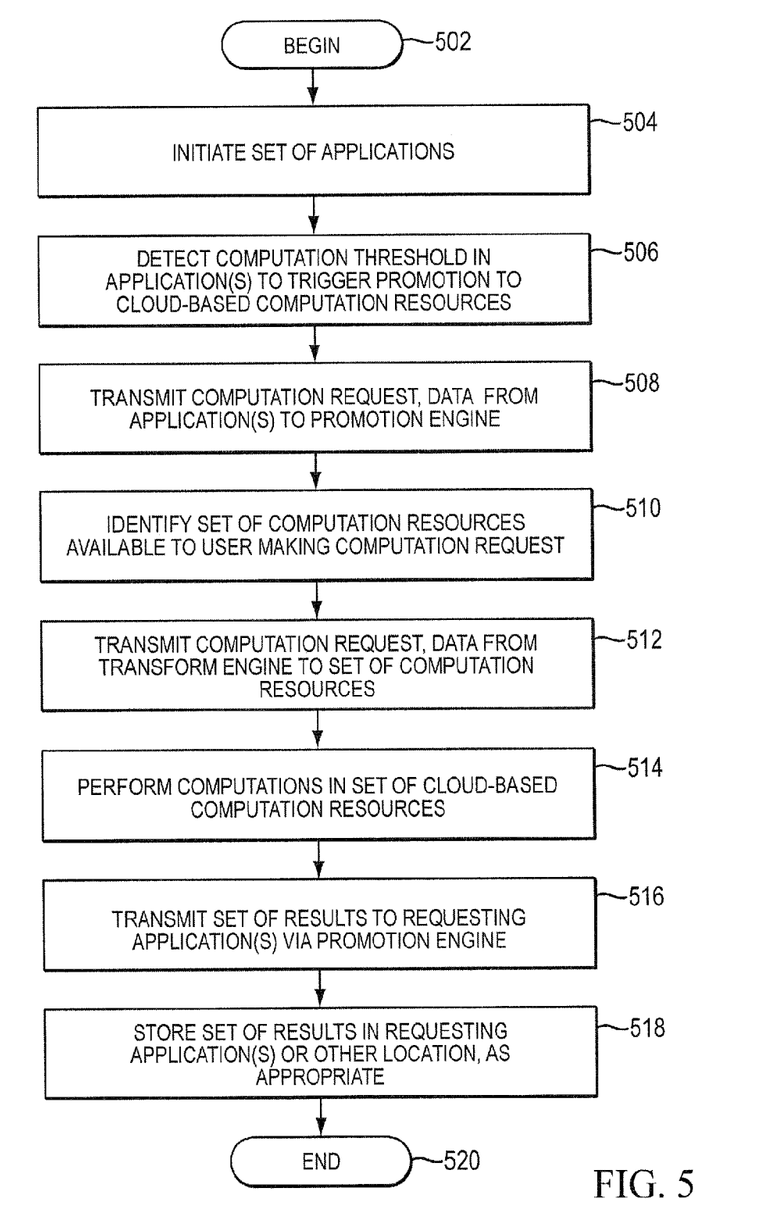
FIG. 5 illustrates a flowchart of overall cloud-based processing of promoted computational tasks, according to various embodiments.

FIG. 5 illustrates an illustrative flowchart of overall promotion processing to communicate a processing task from set of applications 112 to cloud 102. In 502, processing can begin. In 504, set of applications 112 can be initiated, for instance, on a personal computer, network-enabled cellular telephone, or other client or device. In embodiments, set of applications 112 can include one or more spreadsheet applications. In embodiments, set of applications 112 can in addition or instead also include database applications, modeling applications, statistical applications, or other quantitative, numerical, or computational software or applications.

In 506, a computation threshold 120 can be detected to trigger the promotion of a computation task to set of computation resources 118 in cloud 102, for example, by an application in set of applications 112 that is preparing to execute a set of calculations, or by promotion engine 126. In embodiments, computation threshold 120 can be a predetermined threshold, for example, a threshold based on computation time, computation throughput, or the size of data 122. For example, computation threshold 120 can be set to a computation time on the user's local machine of 15 minutes, or to a size of at least 1000 by 1000 cells in data 122. Other types and values of computation threshold 120 can be used.

In 508, one or more requesting application in set of applications 112 can transmit a computation request 114 and data 122 to promotion engine 126. In embodiments, computation request 114 can specify parameters for the requested calculation or computation, such as the format of the data 122, the precision or accuracy of the desired output of the computation, the time at which the set of results 140 are desired, and/or other settings or parameters. In embodiments, data 122 can be or include spreadsheet data, database data such as online analytical processing (OLAP) multi-dimensional data, relational database tables, or data encoded in other formats or schema.

In 510, promotion engine 126 can identify set of computation resources 118 in cloud 102 that is available to the user of the requesting application to carry out enhanced calculations. In embodiments, set of computation resources 118 can be or include a set of servers, personal computers, or other devices, machines, or networks representing comparatively greater computational power than that available on the local client hosting set of applications 112. For instance, set of computation resources 118 can be or include one or more processors, or clusters of processors, which together represent a comparatively high-throughput computation engine or resource. In embodiments, promotion engine 126 can scale the set of computation resources 118 to match the size and type of computation request 114 and/or data 122.

In 512, promotion engine 126 can transmit the computation request 114 and data 122 to the set of computation resources 118 in cloud 102. In 514, the set of computation resources 118 can perform or executed the requested calculations or other processing to generate a set of results 140. In 516, the set of computation resources 118 can transmit the set of results 140 to the requesting application(s) in set of applications 112 via promotion engine 126, or directly to that application(s). In 518, the requesting application(s) and/or promotion engine 126 or other logic can store the set of results, for instance in the local computer hosting set of applications 112, or to another location. In 520, processing can repeat, return to a prior processing point, jump to a further processing point, or end.

The foregoing description is illustrative, and variations in configuration and implementation may occur to persons skilled in the art. For example, while embodiments have been described in which a computation request 114 is transmitted to a set of computation resources 118 hosted or embedded in a cloud 102, in embodiments, the computation request 114 can in addition or instead be transmitted to other types of computation resources. For example, in embodiments the computation request 114 can be transmitted to a database server, to a highly parallel machine or other computation cluster or network, or to other computation resources. For further example, while embodiments have been described in which the calculations in response to computation request 114 are performed in a single processing operation, in embodiments, the processing initiated by computation request 114 can be carried out in stages, or be shared between multiple sets of computation resources 118. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a processor communicatively coupled to a local computing system and a remote computation resource, from an application running on the local computing system, a request for the remote computation resource to perform a computational task, wherein the remote computation resource comprises a plurality of resource servers, managed by a cloud management system, to host virtual machines, and wherein the request specifies a processor throughput requirement and a communication bandwidth requirement for a virtual machine to serve as part of the remote computation resource;
transmitting, by the processor, the request to cause the cloud management system to:
identify a set of resource servers of the plurality of resource servers to deliver the processor throughput requirement and the communication bandwidth requirement;
generate a resource aggregation table that identifies the set of resource servers to supply the processor throughput and the communication bandwidth;
build, using the resource aggregation table, a plurality of virtual machines that each meets the processor throughput requirement and the communication bandwidth requirement to perform the computational task; and
perform the computational task using the plurality of virtual machines;
receiving, by the processor, a set of results generated by the remote computation resource having performed the computational task using the plurality of virtual machines; and
transmitting, by the processor, the set of results to the local computing system.

2. The method of claim 1, wherein the request is generated by the application by comparing a computation time to perform the computation task with a threshold value, wherein the threshold value is determined in view of a deviation from an average computation time, and wherein the remote computation resource comprises at least one of a set of cloud-based computation resources or a set of database server resources.

3. The method of claim 1, wherein the application comprises at least one of a spreadsheet application, a database application, a statistical application, or a modeling application.

4. The method of claim 1, further comprising determining whether the application has reached a maximum computation threshold to trigger the request for the remote computation resource to perform the computation.

5. The method of claim 4, wherein the computation threshold comprises at least one of a maximum computational intensity threshold or a maximum data size threshold.

6. The method of claim 1, further comprising storing the set of results in a data store.

7. A system, comprising:
a memory;
a processor, operably connected to the memory, the processor programmed to:
receive, from an application running on a local computing system, a request for a remote computation resource to perform a computational task, wherein the remote computation resource comprises a plurality of resource servers, managed by a cloud management system, to host virtual machines, and wherein the request specifies a processor throughput requirement and a communication bandwidth requirement for a virtual machine to serve as part of the remote computation resource;

transmit the request to cause the cloud management system to:
- identify a set of resource servers of the plurality of resource servers to deliver the processor throughput requirement and the communication bandwidth requirement;
- generate a resource aggregation table that identifies the set of resource servers to supply the processor throughput and the communication bandwidth;
- build, using the resource aggregation table, a plurality of virtual machines that each meets the processor throughput requirement and the communication bandwidth requirement to perform the computational task; and
- perform the computational task using the plurality of virtual machines;

receive a set of results generated by the remote computation resource having performed the computational task using the plurality of virtual machines; and transmit the set of results to the local computing system.

8. The system of claim 7, wherein the request is generated by the application by comparing a computation time to perform the computation task with a threshold value, wherein the threshold value is determined in view of a deviation from an average computation time, and wherein the remote computation resource comprises at least one of a set of cloud-based computation resources or a set of database server resources.

9. The system of claim 7, wherein the application comprises at least one of a spreadsheet application, a database application, a statistical application, or a modeling application.

10. The system of claim 7, wherein the processor is further to determine whether the application has reached a maximum computation threshold to trigger the request for the remote computation resource to perform the computation.

11. The system of claim 10, wherein the computation threshold comprises at least one of a maximum computational intensity threshold or a maximum data size threshold.

12. The system of claim 7, wherein to transmit the set of results, the processor is further to transmit the set of results to the application.

13. The system of claim 7, wherein the processor is further to store the set of results in a data store.

14. A non-transitory computer-readable medium storing instructions that, when executed by a processor, cause the processor to:
receive, by the processor, from an application running on the local computing system, a request for the remote computation resource to perform a computational task, wherein the remote computation resource comprises a plurality of resource servers, managed by a cloud management system, to host virtual machines, and wherein the request specifies a processor throughput requirement and a communication bandwidth requirement for a virtual machine to serve as part of the remote computation resource;

transmit the request to cause the cloud management system to:
- identify a set of resource servers of the plurality of resource servers to deliver the processor throughput requirement and the communication bandwidth requirement;
- generate a resource aggregation table that identifies the set of resource servers to supply the processor throughput and the communication bandwidth;
- build, using the resource aggregation table, a plurality of virtual machines that each meets the processor throughput requirement and the communication bandwidth requirement to perform the computational task; and
- perform the computational task using the plurality of virtual machines;

receive a set of results generated by the remote computation resource having performed the computational task using the plurality of virtual machines; and transmit the set of results to the local computing system.

15. The non-transitory computer-readable medium of claim 14, wherein the request is generated by the application by comparing a computation time to perform the computation task with a threshold value, wherein the threshold value is determined in view of a deviation from an average computation time, and wherein the remote computation resource comprises at least one of a set of cloud-based computation resources or a set of database server resources.

16. The non-transitory computer-readable medium of claim 14, wherein the application comprises at least one of a spreadsheet application, a database application, a statistical application, or a modeling application.

17. The non-transitory computer-readable medium of claim 14, wherein the processor is further to determine whether the application has reached a maximum computation threshold to trigger the request for the remote computation resource to perform the computation.

18. The non-transitory computer-readable medium of claim 17, wherein the computation threshold comprises at least one of a maximum computational intensity threshold or a maximum data size threshold.

19. The non-transitory computer-readable medium of claim 14, wherein to transmit the set of results, the processor is further to transmit the set of results to the application.

20. The non-transitory computer-readable medium of claim 14, wherein the processor is further to store the set of results in a data store.

* * * * *